(12) United States Patent
Brisset

(10) Patent No.: US 7,235,175 B2
(45) Date of Patent: Jun. 26, 2007

(54) DEVICE FOR TREATING HYDROPHILIC SLUDGE BY HYDRAULIC TURBULENCE EFFECT COMBINED WITH OXIDATION AND CHEMICAL REACTIONS BY ADDITIVE INPUT

(75) Inventor: Hervé Brisset, Eguilles (FR)

(73) Assignee: Naturem Environment, Aix En Provence (FR)

( * ) Notice: Subject to any disclaimer, the term of this patent is extended or adjusted under 35 U.S.C. 154(b) by 281 days.

(21) Appl. No.: 10/495,423

(22) PCT Filed: Nov. 22, 2002

(86) PCT No.: PCT/FR02/04006

§ 371 (c)(1),
(2), (4) Date: May 24, 2004

(87) PCT Pub. No.: WO03/043942

PCT Pub. Date: May 30, 2003

(65) Prior Publication Data

US 2005/0006312 A1    Jan. 13, 2005

(30) Foreign Application Priority Data

Nov. 22, 2001    (FR) .................................. 01 15120

(51) Int. Cl.
*C02F 11/14* (2006.01)
(52) U.S. Cl. ....................... 210/199; 210/205; 210/219; 366/275; 366/339
(58) Field of Classification Search .................. 210/199
See application file for complete search history.

(56) References Cited

U.S. PATENT DOCUMENTS

| 3,886,073 | A | * | 5/1975 | Briltz ........................... 210/136 |
| 4,207,007 | A | * | 6/1980 | Yamschikov et al. ........ 366/275 |
| 4,464,257 | A | | 8/1984 | Lynch et al. .............. 210/195.1 |
| 4,885,098 | A | * | 12/1989 | Bodine ........................ 210/702 |
| 5,124,035 | A | * | 6/1992 | Dunne et al. ................ 210/206 |
| 5,248,416 | A | * | 9/1993 | Howard, Jr. .............. 210/195.1 |
| 5,810,514 | A | | 9/1998 | Suchecki, Jr. ............... 405/128 |
| 5,826,979 | A | * | 10/1998 | Foss ........................... 366/242 |
| 5,851,404 | A | * | 12/1998 | Christy et al. ............. 210/723 |
| 6,322,240 | B1 | * | 11/2001 | Omasa ........................ 366/118 |
| 6,935,770 | B2 | * | 8/2005 | Schueler ................... 366/174.1 |

FOREIGN PATENT DOCUMENTS

| DE | 3612313 | 10/1987 |
| DE | 4223618 | 4/1993 |
| DE | 19610926 | 8/1996 |
| EP | 261822 | 3/1988 |
| EP | 284754 | 10/1988 |
| EP | 1157972 | 11/2001 |
| FR | 2201256 | 4/1974 |
| WO | 98/58740 | 12/1998 |

* cited by examiner

*Primary Examiner*—Peter A. Hruskoci
(74) *Attorney, Agent, or Firm*—Dennison, Schultz & MacDonald

(57) ABSTRACT

A method and device for treating sludge and slime to enable reuse in soil upgrading and in building material systems. Hydrophilic sludge and slime having a water content not less than 70% are continuously treated in a manner which enables colloid removal, dehydration, oxidation, sanitation, stabilization, mineralization, filtration and porosification. The device for treatment includes a hollow caisson traversed in the longitudinal direction by the treated product and provided with at least an intake for the product to be treated and at least an outlet for the treated product.

8 Claims, 1 Drawing Sheet

Figure 1:
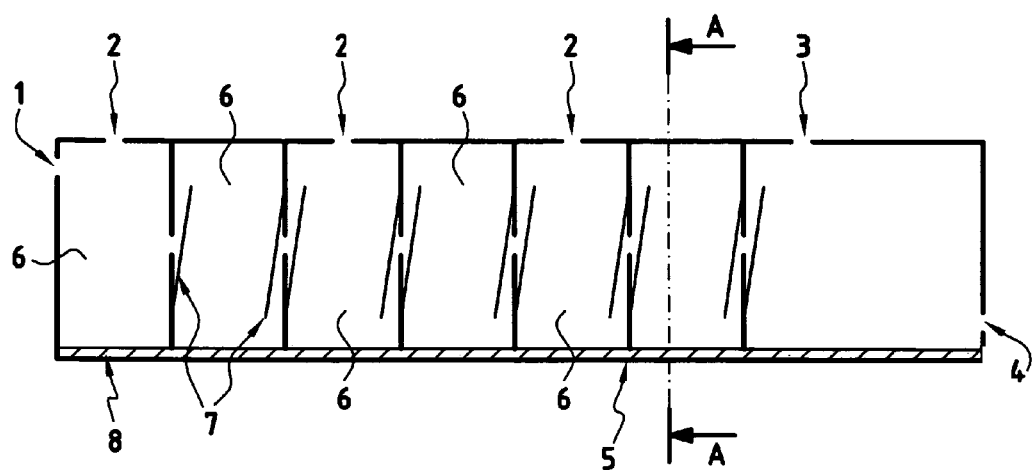
Figure 2:
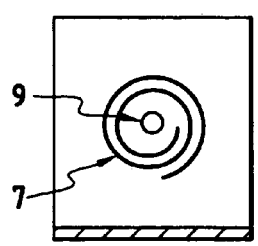

DEVICE FOR TREATING HYDROPHILIC SLUDGE BY HYDRAULIC TURBULENCE EFFECT COMBINED WITH OXIDATION AND CHEMICAL REACTIONS BY ADDITIVE INPUT

This application is a filing under 35 USC 371 of PCT/FR02/04006, filed Nov. 22, 2002.

The present invention concerns a device for treating sludge and slime to enable reuse in soil upgrading and in building material systems.

The technical field of the invention is the manufacturing of equipment for treating sludge and slime.

These products are traditionally dehydrated by evaporation, by centrifuging or by filtration so as to separate the solid fraction from the liquid fraction.

In the case of evaporation, the products are heated to extract their liquid phase.

With filtration, the liquid and solid phases are separated. Filtration is the most widely used method of treating. These techniques are vacuum filtration, pressurised filtration in chambers sealed by filters, chamber plate presses, membrane plate or automatic presses, or even pressure strip filters, friction presses or centrifugal presses.

When they are put into practice these techniques have a fairly low yield due to the fact of the physical characteristic of water in the products to be treated. Water is in two forms, free or trapped in the solid structure. The yield from these devices is often improved by the addition of flocculant or coagulant additives.

The effectiveness of these techniques of evaporation and filtration is limited due to the texture of the treated products. Sludge and slime are products with liquid and solid phases, which are difficult to be dissociated because of the presence of colloidal material. Molecules of a very small size constitute these materials, less than one tenth of a micron, very difficult to decant in water and collecting in hydrophilic packets within the fraction solid. By means of this water retention effect, these materials prevent efficacious dehydration of the sludge and slime which thus remain very humid, heavy, non-porous products, with delicate upgrading especially in the agricultural field.

The object of the method according to the present invention is to remedy the problem of separation in sludge and slime thanks to a strong action on the colloidal material. Originating from in-depth studies on the texture of this material and from putting into perspective of the upgrading potential of these products, the method described herein comprises series of mechanical shocks, oxidation and chemical reactions carried out continuously within specific equipment.

The sludge and slime treated by this equipment are strongly hydrated and fluid, comprising at least 70% of water. The remainder comprises solid mineral and organic materials whereof one part is the colloidal material. The mechanical shocks, the oxidation and the chemical reactions act especially directly on the colloidal material by breaking it and by causing it to react with a reagent in order to modify its form and to extract structural water from it. This material, hydrophilic at the outset rejoins the rest of the solid hydrophobic fraction, thanks to treatment thus facilitating dissociation of the two liquid and solid phases.

The treated products are organic hydrophilic products with a rate of organic matter often greater than 40% of the total of the dry material, such as sludge from purification stations and effluent from the food-processing industry, breweries, slaughterhouses, dairies, canneries, breeding, but also hydrophilic mineral products, whereof the organic matter content can also exceed 40%, such as dredging slime from rivers, canals, ponds, lakes, retaining basins, harbours, or even fibrous sludge from the papermaking industry.

The following description referring to the attached diagrams and given by way of non-limiting example illustrates one of the preferred embodiments of the invention.

FIG. 1 is a drawing of equipment for applying the method;

FIG. 2 is a cutaway view of the equipment illustrated in FIG. 1, in a transverse direction along line A—A.

The equipment is a caisson parallelepiped in shape, divided into hollow compartments 6 separated by walls allowing transfer 9 of material from one compartment to the other and also provided at least on one of their faces with elastic means 7 capable of causing strong turbulence by counter-currents inside each compartment.

Each hollow compartment is open to the exterior by means of at least one circular opening 2 and 3 for connecting to a compressor, a pump or other similar equipment. The caisson is elongated in shape. The end sections are provided with inlet devices 1 for products to be treated and outlet devices 4 for treated products.

In its lower part, the equipment is fitted with a filtration means for evacuating part of the liquid phase during its course in the caisson. Filtration is carried out by a textile structure 8 occupying the surface of at least one compartment. Evacuation is carried out by gravity under the equipment. Depending on the treated products, this gravity evacuation 5 is open or closed to runoff. The equipment is made of stainless steel, allowing to benefit from the catalytic action of $Fe^{3+}$ ions. The equipment works without limiting flow rate by adapting its dimensions. It is constituted for example by a hollow caisson parallelepiped in shape, characterised by a small-surface section transverse to the flow and a considerable length parallel to the flow of at least 3 times the length of the longest side of the section transverse to the flow.

The method comprises two phases: one phase in which mechanical shocks and oxidation of the material are caused, and one phase in which chemical reactions are triggered by the addition of additives. The two phases are consecutive. The method functions continuously without retaining phase.

The products to be treated are introduced into the equipment at one of its ends. They undergo a phase of strong turbulence caused by the introduction of pressurised air and further by the presence of elastic means secured to the walls (or integrated into the walls) of the compartments making up the equipment. Walls positioned perpendicularly to the flow define these hollow compartments. These walls, which ensure the flow of the products, are also holed and fitted with elastic means causing opposite currents of material and consequently the desired shocks. The counter-currents cause shocks to the constituents of the material, thus breaking the colloidal mass and performing auto-filtration of the product between its different fractions inducing screening between liquid and solid fractions. These effects thus facilitate separation of the two solid and liquid phases. The forced and turbulent aeration contributes strong oxidation of the material. The effect of the aeration of the products is to destroy the anaerobic microorganisms, which might have formed into the products.

The product passes from one compartment to the other by losing power and water.

The water passes over a filtering textile structure situated at the bottom of each compartment. These filtering structures communicate to allow the water to drain out via an orifice located at the bottom of the equipment. The product continues on its way, in the equipment, agitated by turbulence and pressure becoming weaker and weaker. Liquid or solid additives are introduced, benefiting from a relative fall in pressure inside the equipment. These additives with coagulating properties are constituted by iron chloride, iron sulphate, ferrous sulphate, aluminium sulphate, chloro iron sulphate, polymer flocculants, sodium silicate, sodium aluminate and strong bases, powdered lime, magnesium lime, live lime, caustic sodium hydroxide and magnesium oxide, or a mixture of at least two of these products.

These additives, which affect the solid material, bathe in an oxidized medium so as to modify its macroscopic and microscopic structures. Coagulants and flocculants create the necessary electromagnetic conditions to aggregate the solid hydrophobic particles in order to increase granulation of the solid fraction. Strong bases, coagulants and flocculants occur as chemical reagents and ionic catalysts. These additives produce a reaction on the organic matter and on the colloidal material whereof the macroscopic structures have been broken within strongly aerated preceding compartments. Accelerated by favourable electromagnetic conditions provided by the contribution of metallic ions, acid-base and oxido-reduction reactions occur, with favour for oxidation and thus allow mineralisation of a part of the ionised structures of the organic matter and of the colloidal material. The consequence of increasing the hydrogen potential to very high values, 10 to 12, is to destroy the aerobic microorganisms, which might have formed within the products.

The formation of macroscopic hydrophobic conglomerates and microscopic mineral structures also leads to reduction of the density of the solid fraction by introduction of porous lacunar vacuum.

Thanks to the intense aerobic agitating and the addition of reagents, the exchange capacity brings suitable oxygen absorption and irreversible oxidation of positive and metallic ions working towards the desired stability of the material.

The molecules being formed in a more or less prolonged state of anoxia are thus transformed into their oxidised form. The ammonia $NH_3$ is transformed into nitrate $NO_3$, the hydrogen sulphide $H_2S$ is transformed into sulphidic acid $H_2SO_3$. The methane $CH_4$ is transformed into carbon dioxide $CO_2$ and into water $H_2O$.

The method does not give off any nauseous odour. Neither does the final product.

The common and heavy metals found in the product to be treated in the ionised form are transformed into theirs oxides.

The products exit from the equipment by the end opposite to the inlet. The stripped gases $CO_2$ and $NO_3$ escape from the equipment along with the treated product. The treated product is still mixed with water, the majority of which is now in the interstitial form. In this form, the water becomes easy to extract by evaporation, draining, centrifuging or by pressing the product.

The products obtained after treating can be sold off by several avenues. In the agricultural field the product becomes a porous area of soil capable of improving the humic clay complex of soils on the condition that their low content of heavy metals, copper, zinc, lead, cadmium, nickel, mercury or selenium allows this. In the field of substitution materials, the product, if it originates from an initially strongly mineralised product or if it is mineralised by the method, can be introduced in industrial manufacturing processes of brick, building blocks or other construction materials.

EXAMPLE

The treatment equipment comprised a steel vat measuring 10 m long and 2 m in diameter, inside which were placed 2 walls cut out such that the passage section of each cut-out formed in the wall describes a spiral, such that each wall ensures a transfer function for the sludge to be treated from one compartment to the adjacent compartment, as well as an elastic means function generating shocks and counter-currents.

This equipment was fitted with two Archimedes screws for extraction and transfer of the sludge after treatment. The ensemble weighed 14 tons empty.

The equipment comprised a low-pressure air compressor supplying airflow of 1000 $m^3$/h at a pressure of 1.7 bar (absolute), and 2 systems for metering and transferring of reagents to the vat.

The whole was fed by an electrogenic group with a power of 70 kW.

Two types of reagents were used: slaked lime $Ca(OH)_2$ in a proportion of 5% of the rate of organic matter contained in the sludge entering the equipment, and a cationic polymer in a proportion of 0.05% of the rate of dry material (organic and mineral material) contained in the sludge entering the equipment.

The walls located inside the vat were placed perpendicularly to the flow of the sludge (and to the longitudinal axis of the vat).

They delimited three successive compartments. In the first, placed in the direction of flow of the sludge were introduced, apart from sludge, pressurised air and the lime in an aqueous solution. The polymer in an aqueous solution was introduced into the second. Decantation of the heavy material, which was extracted by the Archimedes screws at the bottom of the vat, took place in the third. The water separated from the solid fraction was evacuated from this third compartment, by overflow.

The sludge with a density of 1.15 entered with a rate of 407 $m^3$/h or 450 T/h. It had a rate of solid material (density 2.5) of 10% in mass of the incoming sludge, or 45 T/h or 18 $m^3$/h.

The rate of organic material contained in this solid material was in a proportion of 10%, or 4.5 T/h; the rest of the solid material was mineral material.

1000 $m^3$/h of air at 1.7 bar, 225 kg/h of slaked lime and 22.5 kg/h of polymer were introduced.

After decantation and extraction by the Archimedes screw, sludge with a density of 1.7 was obtained with a rate of 40 $m^3$/h or 67 T/h. The treated sludge leaving the equipment contained 45 T/h or 18 $m^3$/h of solid material for 22 T/hour or 22 $m^3$/hour of water (density 1).

As it overflows from the vat, the water separated from the solid fraction of the sludge was obtained with a rate of 383 T/h or 383 $m^3$/h. This water contained a rate of solid material of 0.02% or 77 kg/h.

The invention claimed is:

1. A device for continuous treatment of a hydrophilic sludge or slime product containing at least 70% water and a solid fraction comprising colloidal material, said device comprising:
    a caisson having an elongated shape with longitudinal axis, through which the product flows along the longitudinal axis between at least one inlet and an outlet at opposite ends of the caisson,
    at least one orifice for introducing pressurized air into the caisson, at least one orifice for introducing chemical additive into the caisson, at least one wall within the caisson perpendicular to the longitudinal axis of the caisson, separating the caisson into at least two hollow compartments, and at least one elastic means device secured to said wall, wherein said wall permits transfer of product from one compartment to an adjacent compartment, and said elastic means device is constructed and arranged to cause counter-currents inducing mechanical shocks and hydraulic turbulence in the product in at least one of said compartments, thereby breaking the colloidal material and performing auto-filtration of the product.

2. The device as claimed in claim 1, wherein said wall is also pierced and perpendicular to the flow of the product.

3. The device as claimed in claim 1, wherein the caisson has a length at least three times that of a longest side of a section transverse to the flow.

4. The device as claimed in claim 1, wherein the caisson also comprises a filtration device.

5. The device as claimed in claim 4, wherein the filtration device comprises a textile structure.

6. The device as claimed in claim 4, wherein the filtration device is disposed at a bottom of said caisson, thereby allowing water in the sludge or slime product to drain out of said caisson.

7. The device as claimed in claim 1, wherein the elastic means device is integral with the wall between said at least two compartments.

8. The device as claimed in claim 1, wherein said elastic means device is made of a spiral-shaped cut-out in the wall between said at least two compartments.

* * * * *

UNITED STATES PATENT AND TRADEMARK OFFICE
CERTIFICATE OF CORRECTION

| | |
|---|---|
| PATENT NO. | : 7,235,175 B2 |
| APPLICATION NO. | : 10/495423 |
| DATED | : June 26, 2007 |
| INVENTOR(S) | : Herve Brisset |

It is certified that error appears in the above-identified patent and that said Letters Patent is hereby corrected as shown below:

Title Page, after "(73) Assignee:" change "Naturem Environment" to --Nemeau--.

Signed and Sealed this

Twenty-eighth Day of October, 2008

JON W. DUDAS
*Director of the United States Patent and Trademark Office*